UNITED STATES PATENT OFFICE.

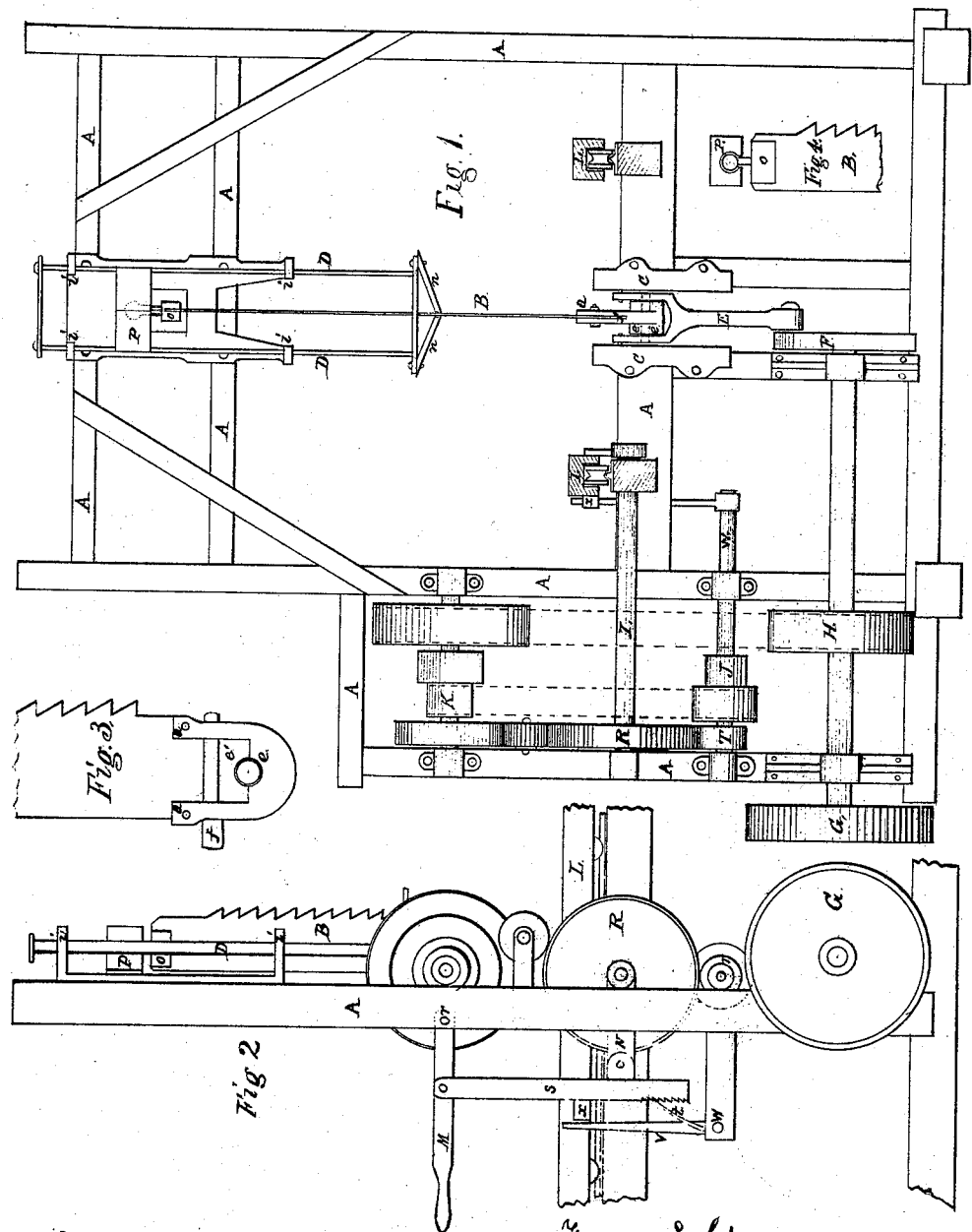

THOMAS E. CHANDLER AND JOHN C. BARTHOLOMEW, OF INDIANAPOLIS, IND., ASSIGNORS TO THOMAS E. CHANDLER AND FRANKLIN TAYLOR, OF SAME PLACE.

IMPROVEMENT IN SAW-MILLS.

Specification forming part of Letters Patent No. 98,558, dated January 4, 1870.

*To all whom it may concern:*

Be it known that we, THOMAS E. CHANDLER and JOHN C. BARTHOLOMEW, both of Indianapolis, in the county of Marion and State of Indiana, have invented new and useful Improvements in Portable Saw-Mills; and we do hereby declare that the following is a full, clear, and exact description thereof, that will enable skilled artisans to make and use the same, reference being had to the accompanying drawing, and to the letters of reference marked thereon, making part of this specification.

This invention relates to arranging the saw and all the driving, feed, and backing mechanism of saw-mills upon one vertical frame, having for its object to render the mill simple and compact in construction, convenient to operate, perfectly portable, and adapted to be operated by light portable engines.

Figure 1 is a front view of the vertical frame of a muley-saw mill, to which the saw and all the driving and feed and backing mechanism are attached and arranged in accordance with our improvements. Fig. 2 is a side view of the same. Fig. 3 is a view of the lower end of the saw and the piece employed for connecting it to the pitman. Fig. 4 is a view of the upper end of the saw, showing the mode of hanging it by the ball-and-socket joint to the upper slides.

Similar letters of reference indicate corresponding parts in the several figures.

A is the vertical frame-work, to which the saw and all the driving and feed and backing mechanism are attached. B is the saw; C, lower guides; D, upper guides; E, pitman; F, crank-wheel; G, driving-pulley; H, pulley on driving-shaft, from which to operate the feed and backing mechanism; I, feed and backing shaft; J and K, counter-shafts for actuating the shaft I, to give the log-carriage the forward and back movement, as hereafter explained; L, log-carriage; M, lever by which to operate the feed and backing shaft.

The piece connecting the saw with the pitman is clearly shown in the detached Fig. 3, *a a* being the jaws in which the saw is secured, and *e e'* the lower part and cap of the journal-box, arranged to slide between the jaws *a a*. The journal-box and the lower end of the saw are arranged in such relation to each other that a single key, *f*, serves to tighten the cap *e'* upon the journals as they wear away, and also to tighten the saw against the bolts that hold it in the jaws.

In addition to the advantages of this arrangement for this purpose, a greater length of saw is secured, thereby lengthening the stroke of the saw through the log.

The piece connecting the saw and the pitman is pivoted in the jaws of the latter, below the point at which the pitman is pivoted to the slides that run in the guides C, so that the saw will be thrown backward, and prevent contact with the log as it ascends, and forward, so as to cut it as it descends.

The upper end of the saw is held in a clamp, O, that is hung by a ball-and-socket joint in slides P, that run between the vertical guide-bars D. This ball-and-socket joint allows the saw to make the back-and-forth vibratory motion above mentioned, as given by the manner of connecting it with the pitman, and also admits of the lateral adjustment of the saw in the lower jaws *a* by the set-screws usually employed, and also allows the saw to adjust itself in the wooden guide-pieces *n*.

The upper guides consist of the vertical bars D, that are arranged to be adjustable vertically in jaws *i i*, so that the wooden guide-pieces *n* may be raised or lowered, to adapt them to logs of various size, the object being to support the saw as close to the log as practicable, to prevent lateral vibratory motion.

The log-carriage is caused to travel backward or forward by simply raising or lowering the lever M, which has its fulcrum at *r*, and connects, by bar *s*, with the lever N, attached to the journal-box, in which the outer end of the feed and backing shaft I is hung, which brings the pulley R in contact with the friction-pulley T to feed the log forward, and with a pulley on shaft K to back it, in the usual manner.

The lower end of bar *s* is notched, and a pawl, *t*, attached to one end of a rock-shaft, W, engages therewith, to hold the pulley R on feed and backing shaft I in contact with the feed-pulley T. The other end of rock-shaft W has a lever, V, attached, by which to actuate the rock-shaft and pawl, and that also serves as the means by which the pawl is automatically disengaged from the notched bar *s* when the saw has cut through the log, the latter being effected by means of a projection, *x*, on the side of the log-carriage, which engages with the lever V, and turns it back when the carriage has traveled the proper distance forward.

The arrangement of all the driving and operating mechanism on the same vertical frame with the saw has advantages, in respect of simplicity and cheapness of construction and convenience of operating, that will be readily appreciated by those experienced in such machinery.

We make no claim to any part of the driving or feeding and backing mechanism A, nor to giving the saw a backward movement in ascending and a forward movement in descending, as these have been used before.

Having thus fully described our invention, what we claim as new, and desire to secure by Letters Patent, is—

The arrangement of the feeding and backing mechanism herein described, consisting of the counter-shafts K and J, feed and backing shaft I, idle-pulley and crank-shaft H, together with the slides C and D, all upon the same vertical frame upon which the saw B is hung.

THOMAS E. CHANDLER.
JOHN C. BARTHOLOMEW.

Witnesses:
WM. H. WEEKS,
O. F. MAYHEW.